United States Patent
Seegel et al.

(10) Patent No.: US 10,029,825 B2
(45) Date of Patent: Jul. 24, 2018

(54) METHOD AND SYSTEM FOR LEAK DETECTION IN VACUUM BAGGING

(71) Applicant: Airbus Operations GmbH, Hamburg (DE)

(72) Inventors: Hauke Seegel, Stade-Buetzfleth (DE); Claus Fastert, Drochtersen (DE); Paulin Fideu, Stade (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/908,418

(22) Filed: Jun. 3, 2013

(65) Prior Publication Data
US 2013/0330832 A1    Dec. 12, 2013

Related U.S. Application Data

(60) Provisional application No. 61/657,052, filed on Jun. 8, 2012.

(30) Foreign Application Priority Data

Jun. 8, 2012 (EP) .................................. 12171296

(51) Int. Cl.
*B65D 33/00* (2006.01)
*B29C 70/44* (2006.01)
*G01M 3/04* (2006.01)

(52) U.S. Cl.
CPC .......... *B65D 33/004* (2013.01); *B29C 70/443* (2013.01); *G01M 3/04* (2013.01); *Y10T 428/1334* (2015.01); *Y10T 428/24802* (2015.01)

(58) Field of Classification Search
CPC .................................. G01M 3/04; B29C 43/12
(Continued)

(56) References Cited

U.S. PATENT DOCUMENTS 2,487,077 A * 11/1949 Shepherd ................. A61B 5/08
                                                                422/416
4,942,013 A *  7/1990 Palmer et al. ................. 264/511
(Continued)

FOREIGN PATENT DOCUMENTS

EP       1484165        12/2004
GB       2465770 A       6/2010
(Continued)

OTHER PUBLICATIONS

Machine translation of WO 2010105811 A1 obtained from ESPACENET on Sep. 1, 2015.*
(Continued)

*Primary Examiner* — Christopher Adam Hixson
*Assistant Examiner* — Emily R. Berkeley
(74) *Attorney, Agent, or Firm* — Greer, Burns & Crain, Ltd.

(57) ABSTRACT

A material for use in vacuum bagging a component. The material includes a compound sensitive to moisture, such that an exposure of the compound to moisture or wetting causes a physical and/or chemical change in the compound that is visually detectable in the cover material. A method of leak detection during vacuum bagging involves the steps of: arranging a component in a vacuum bagging assembly, such as to form a fiber-reinforced plastic component; arranging a material according to the invention in the vacuum bagging assembly such that the compound sensitive to wetting or moisture is under, or on an inner side of, a sealing film or vacuum bag of the assembly; applying a vacuum to the vacuum bagging assembly to evacuate a space containing the component and sealed by the sealing film or vacuum bag; and wetting an outer surface of the sealing film or vacuum bag.

9 Claims, 1 Drawing Sheet

(58) Field of Classification Search
USPC .......................................... 436/172; 116/206
See application file for complete search history.

(56) References Cited

U.S. PATENT DOCUMENTS

| | | | |
|---|---|---|---|
| 5,686,161 A * | 11/1997 | Cullen et al. .................... | 428/68 |
| 2008/0152918 A1 | 6/2008 | Pado et al. | |
| 2009/0273107 A1 | 11/2009 | Advani et al. | |
| 2009/0301382 A1* | 12/2009 | Patel ........................ | G01K 3/04 |
| | | | 116/201 |
| 2011/0079174 A1* | 4/2011 | Miller et al. .................. | 116/201 |

FOREIGN PATENT DOCUMENTS

| | | | | |
|---|---|---|---|---|
| WO | WO 2010105811 A1 * | 9/2010 | ............ | G01M 3/042 |
| WO | 2012026980 | 3/2012 | | |

OTHER PUBLICATIONS

Efunda May 31, 2010 (https://web.archive.org/web/20100531163350/http://www.efunda.com/sponsors/inventables/WaterIndicatorTape/WaterIndicatorTape_Intro.cfm).*
European Search Report, dated Nov. 23, 2012.
EPO Exam Report, dated Jun. 23, 2015.

* cited by examiner

METHOD AND SYSTEM FOR LEAK DETECTION IN VACUUM BAGGING

CROSS-REFERENCES TO RELATED APPLICATIONS

This application claims the benefit of the U.S. Provisional Application No. 61/657,052, filed on Jun. 8, 2012, and of the European patent application No. 12 171 296.2 filed on Jun. 8, 2012, the entire disclosures of which are incorporated herein by way of reference.

FIELD OF THE INVENTION

The present invention relates to a system and method for leak detection in vacuum bagging, and a material for use in vacuum bagging.

BACKGROUND OF THE INVENTION

Vacuum-bagging, or vacuum bag laminating as it is also known, is a technique widely used in the aircraft and aerospace industries to fabricate high strength-to-weight ratio fibre-reinforced composite components. Indeed, efforts are being made in aircraft construction to employ components on an increasing scale that consist either completely or at least partly of fibre-reinforced composite components, e.g. carbon-fibre-reinforced plastics (CFRP), as structural or load-bearing elements.

Vacuum-bagging is performed by sealing a plastic film or bag over or around a composite component, which may be positioned on a moulding tool. The composite component may, for example, be in the form of a wet laid-up laminate, or may comprise a core and/or reinforcing fibres into which a liquid polymer or resin is infused. The air enclosed by the sealing film or bag is then extracted or evacuated via a vacuum pump so that up to one atmosphere (1 bar) of pressure can be applied to the component. The compression generated by the vacuum thus helps to remove air, voids, and excess gas given off during curing in and around the component. To get optimal properties from carbon-fibre-reinforced plastic components made by hand lay-up or wet lay-up, most must be cured by a combination of heat and pressure (e.g. vacuum).

The vacuum bagging process is generally only as good as the method for detecting leakages in the sealing film or vacuum bag. Leakages can lead to porosities in the component and are often difficult to detect and to locate, particularly with large composite components. The methods usually employed are based on acoustic principles, but for small leakages and in a noisy environment and/or for large components, these methods are not very accurate, are unreliable and are difficult to automate.

To check the air-tightness of a sealing film or vacuum bag in a vacuum bagging assembly, a pressure loss inside the bag is measured over a specific time. If the pressure loss is higher than a predefined value, the seal is deemed inadequate (i.e. not tight) and a time- and labour-intensive search for the leakage starts. The sealing areas between the film or bag and the moulding tool are usually checked first and the entire tape joint forming the seal is compressed by hand to close any possible air gaps. If another measurement shows that this was not successful, a very sensitive microphone is used to check along the seal for fizzling noises. This requires quite a lot of experience and is difficult in a noisy environment. If the tape joint itself seems to be tight, then the entire sealing film or vacuum bag needs to be checked. This often simply results in a complete exchange of the sealing film or vacuum bag, however, as an inspection is so time- and labour-intensive that replacing the film or bag is often deemed to be a more economical approach.

SUMMARY OF THE INVENTION

It is therefore an idea of the present invention to provide a new and improved technique for leak detection during vacuum bagging, and to provide a new and improved material for use in that technique.

Preferred features of the invention are recited in the dependent claims.

According to one aspect, therefore, the invention provides a material for use in vacuum bagging a component, especially a composite component, such as a fibre-reinforced plastic component. The bagging material includes a compound sensitive to moisture, such that exposure of the compound to moisture or wetting causes a physical and/or chemical change in the compound that is visually detectable in the material.

The material of the invention thus provides the means for a new technique of ensuring vacuum-tightness in sealing films or vacuum bags in composite manufacturing. Furthermore, the principles of this new technique are applicable to a range of vacuum-assisted manufacturing processes (e.g. using prepregs or via infusion). After laying-up a vacuum bagging assembly employing the material of the invention, the moisture-sensitive compound can be used to quickly and easily detect any leakages in the sealing film or vacuum bag.

In a preferred embodiment, the wetting- or moisture-sensitive compound is sensitive to water moisture and/or to wetting by water. Water-sensitive compounds are especially preferred as water is cheap and readily available, and also presents no health risks to operators involved in the vacuum bagging. It will be noted, however, that a compound sensitive to moisture or wetting from other liquids (i.e. besides water) may also be contemplated for the material of this invention.

In a preferred embodiment the material is provided as a sheet material and desirably forms a cover layer for covering the component during vacuum bagging. In this regard, the sheet or cover material is arranged such that the compound sensitive to moisture or wetting is on an inner side of a sealing film or vacuum bag of a vacuum bagging assembly. Accordingly, in a particularly preferred embodiment, the material is provided as a breather material for covering the component as an intermediate layer arranged between the component and a sealing film or vacuum bag in the vacuum bagging assembly. In an alternative preferred embodiment, however, the material may be provided as the sealing film or vacuum bag itself, with the moisture-sensitive compound provided on a side of the material configured to face the component. In this way, the moisture-sensitive compound will necessarily be arranged inside the space enclosed by the sealing film or vacuum bag in use, and thereby only come in contact with the moisture or wetting liquid (e.g. water) if there is a leak in the seal.

In an alternative preferred embodiment, the material of the invention is provided as a tape material, and especially as a sealing tape for sealing the sealing film or vacuum bag of a vacuum bagging assembly, for example, to a moulding tool, as will be described in more detail later. Thus, the material of the invention may be embodied as bagging tape.

In a preferred embodiment the wetting- or moisture-sensitive compound is provided substantially uniformly throughout the material. In this way, should any wetness or moisture breach the sealing film or vacuum bag of the vacuum bagging assembly, the material will react to that moisture upon contact and be visually detectable, regardless of a location of that leak or breach. Alternatively, however, the compound may be provided at discrete locations over an area or surface of the material. In that case, a reaction to any wetness or moisture that breaches the sealing film or vacuum bag will only occur and be visually detectable if the moisture reaches one of those discrete locations.

In a preferred embodiment the physical and/or chemical change caused by exposure to the wetting or moisture is visually detectable in the visible light spectrum, and preferably to the naked eye of an operator, such that an unassisted visual inspection by an operator may readily reveal that change. As an alternative, however, the physical and/or chemical change caused by exposure to wetting or moisture may be visually detectable via a camera or an optical sensor device. In this regard, the change may occur in an electromagnetic radiation (EMR) spectrum, such as the infrared (IR) or ultraviolet (UV) spectrum, which is not visible to the naked eye. Thus, in a particularly preferred embodiment, a physical and/or chemical change in the compound caused by an exposure to wetting or moisture includes one or more of: colour change, translucence change, opacity change, fluorescence change and temperature change. To this end, for example, the moisture-sensitive compound may comprise $CuSO_4$ or $CoCl_2$ for generating a colour change upon contact with water. The compound may optionally be combined with a silica gel in order to be particularly hydrophilic. Alternatively, or in addition, the compound may comprise a zeolite, which reacts exothermically with water to generate heat, which in turn may be visually detected via an infrared (IR) camera or sensor device.

According to another aspect, the present invention provides a method of leak detection during vacuum bagging, comprising the steps of:

arranging a component in a vacuum bagging assembly, e.g. for impregnation with a polymer or resin, and especially to form a fibre-reinforced plastic composite component;

arranging a material of the invention as described above in the vacuum bagging assembly such that the compound sensitive to moisture is on an inner side of a sealing film or vacuum bag of the vacuum bagging assembly—e.g. around a periphery of, or on an inner side of, a space containing the component and sealed by the sealing film or vacuum bag;

applying a vacuum to the vacuum bagging assembly to evacuate a space containing the component and sealed by the sealing film or vacuum bag; and wetting an outer surface of the sealing film or vacuum bag.

In a preferred embodiment of this method, the step of wetting the outer surface of the sealing film or vacuum bag is carried out after the step of applying a vacuum to evacuate a space containing the component and sealed by the sealing film or vacuum bag. Thus, if there is a leak in the seal formed by the sealing film or vacuum bag, the wetting liquid will tend to be drawn through the leak or breach under the action of the applied vacuum to contact and react with the moisture-sensitive compound of the material. The step of wetting the outer surface of the sealing film or vacuum bag may be carried out before or after impregnating the component with a polymer or resin. In this regard, the infiltration of a small amount of liquid inside the sealing film or vacuum bag does not appreciable inhibit production of the composite component as the amount of liquid is very small and it evaporates under vacuum and heat very quickly.

In a preferred embodiment of the method, the step of wetting the outer surface of the sealing film or vacuum bag includes applying water, preferably in a spray, to at least a portion of the outer surface of the sealing film or vacuum bag. That is, the method preferably includes the step of spraying at least a portion of, and preferably the entire, outer surface of the sealing film or vacuum bag with water.

In a preferred embodiment the method comprises the step of inspecting the wetted sealing film or vacuum bag of the vacuum bagging assembly to detect a leak in the sealing film or vacuum bag by means of a physical and/or chemical change in the compound caused by an exposure to moisture. The step of inspecting the wetted sealing film or vacuum bag may comprise a visual inspection of the vacuum bagging assembly with the naked eye and/or with a camera or optical sensor device. That is, the camera or optical sensor device may be configured to visually detect said physical and/or chemical change in the compound caused by exposure to moisture.

According to a further aspect, the present invention provides a component, and particularly a composite component, such as a fibre-reinforced plastic component, formed according to the method of the invention described above.

According to still a further aspect, the invention provides a system for leak detection in vacuum bagging of a component, especially a fibre-reinforced plastic composite, the system comprising a vacuum bagging assembly incorporating a material according to the invention as described above, e.g. to cover the component or to seal the vacuum bagging assembly, wherein the moisture-sensitive compound of the material is provided on an inner side or periphery of a sealing film or vacuum bag of the vacuum bagging assembly.

In a preferred embodiment, the system includes a wetting device for applying water or other liquid to the sealing film or vacuum bag during use. For example, the wetting device may include a spray nozzle configured for attachment to a water supply. The system preferably also includes a camera and/or an optical sensor device configured to inspect the sealing film or the vacuum bag of the vacuum bagging assembly for detecting a physical and/or chemical change in the compound of the material caused by its exposure to moisture.

In a particularly preferred embodiment, the system includes a control unit for controlling operation of one or more part of the system, such as the camera, the optical sensor device, and/or the wetting device. In this way, the system of the invention may provide automation of the leak detection by automatically controlling the wetting of the sealing film or vacuum bag (i.e. via the wetting device) and by automatically controlling inspection of the wetted sealing film or vacuum bag (i.e. via the camera and/or the optical sensor device).

The present invention thus provides a system and method which are able to significantly enhance the ease and convenience in the manufacture of composite components, while also enabling a substantial improvement in the manufacturing speed.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a less abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of enquiry and study, except where specific meanings have otherwise been set forth herein.

DETAILED DESCRIPTION OF THE PREFERRED EMBODIMENTS

Figure 1:
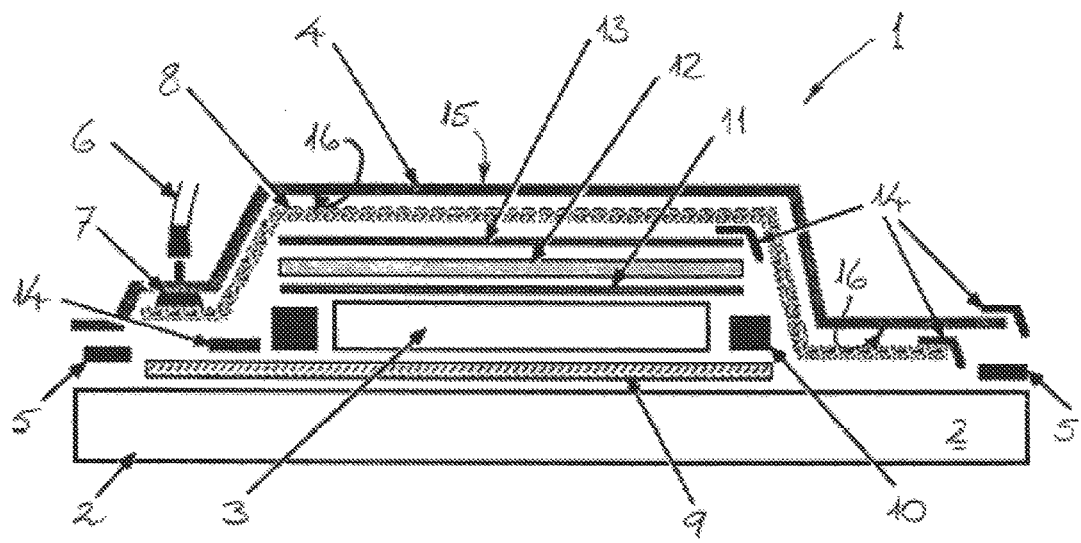
FIG. 1 is a schematic cross-sectional view of a vacuum bagging assembly according to an embodiment of the invention.

With reference to FIG. 1 of the drawings, a schematic cross-sectional view of a vacuum bagging assembly 1 according to an embodiment of the invention is illustrated. Vacuum bagging assembly 1 includes a moulding tool 2 that constitutes a base of the assembly 1 and may incorporate a mould or profile (not shown) for imparting a desired shape or form to a composite component 3 supported thereon. The composite component 3 in this example comprises a wet laid-up laminate of carbon-fibre fabric sheets impregnated with a liquid resin/epoxy material.

A sealing film or vacuum bag 4 is provided as the outermost layer of the assembly 1 and is sealed around its peripheral edges to the moulding tool 2 via tape members 5. This sealing film or vacuum bag 4 comprises a polymer sheet material that is impervious to gas and it is sealed via the tape members 5 so as to be "air-tight" when a vacuum is drawn against it to compress the lay-up. If the moulding tool 2 is too small to adhere the sealing film 4 around its edges, the sealing film may be constructed as an actual bag and configured to receive the layup and the mould inserted therein.

The vacuum bagging assembly 1 further includes a vacuum pump (not shown) which is connected via a hose 6 and a valve 7 to the sealing film or vacuum bag 4 for evacuating or extracting the air and gas enclosed by the bag 4 and contained in the assembly lay-up. A pressure gauge may also be provided to enable an operator to see how much vacuum pressure is being applied to the component. Immediately adjacent to the sealing film or vacuum bag 4 is a breather material 8 provided as a sheet or cloth which extends over the composite component 3 and allows air and gas to be drawn from all parts of the lay-up during application of the vacuum. The breather material 8 also ensures that the sealing film or vacuum bag 4 does not seal upon itself when the vacuum is applied.

A release ply or release film 9 is typically arranged between the moulding tool 2 and the composite component 3 to ensure easy separation of the component 3 from the moulding tool 2 after the vacuum bagging. The release ply 9 may be perforated and is coated so as not to stick to the resin/epoxy and pull cleanly away from the component 3 after curing is completed. Dam members 10 are arranged extending around a periphery of the composite component 3 to confine the resin/epoxy material during the vacuum bagging.

Arranged over a top surface of the composite component 3 is a peel ply 11, which is a coated film that allows excess resin or epoxy to flow there-through but also pulls away cleanly from the component 3 after curing is finished. This peel ply 11 also leaves the component 3 prepped (i.e. slightly rough) so that another layup may be bonded to it properly. A bleeder layer or cloth 12 is then arranged over the peel ply 11 and composite component 3 and, like breather material sheet 8, is configured to allow air and gas generated during curing to be drawn from all parts of the lay-up during the vacuum bagging compression. A further release ply or film 13 may separate bleeder layer or cloth 12 from the breather sheet 8. Pressure sensitive tape 14 may be used along corners or edges of the respective films or sheets to secure the lay-up of the vacuum bagging assembly 1.

By evacuating the air and gas enclosed by the sealing film or vacuum bag 4 via the vacuum hose 6, a maximum compression pressure of one atmosphere (1 bar) can be obtained with the vacuum bagging assembly 1, although practically the pressure is typically in the range of 80% to 90% of this figure. If higher pressures are required, the entire assembly 1 can be placed in an autoclave, which can typically add anywhere from 3 to 7 bar of pressure, in order to consolidate the layup of the component 3 by compression and remove entrapped air and volatiles (from the vacuum). The autoclave can also heat the assembly 1 to assist curing, particularly with epoxy resins.

In a first embodiment of the present invention, the breather material 8 is completely or at least partially fabricated from the mineral zeolite, which is sensitive to water. That is, the zeolite reacts exothermically with water moisture to emit heat. After completing lay-up of the bagging assembly 1, a small amount of water is sprayed over an outer surface 15 of the sealing film or vacuum bag 4. If a leakage is present, the water is drawn through the leak into the zeolite breather material 8, which absorbs the water and emits heat. By using an infrared (IR) camera, this heat can be made visible such that the area of the leakage is detected and can be repaired. Because zeolite is a volcanic mineral it is expected to stand the temperatures typical for curing in an autoclave or oven. The manufacturing of this breather material 8 out of zeolite is expected to be analogous to production of basalt fibres. Furthermore, if the breather sheet 8 is not contaminated with resin during the vacuum bagging, it may be re-used several times. Analysis of the images generated by the IR camera can be automated and documented by a test system.

In a second embodiment of the present invention, a compound which reacts in contact with water (or other harmless liquid) and changes colour, e.g. a chemical or humidity indicator such as $CuSO_4$ or $CoCl_2$ combined with silica gel, or orange gel, is incorporated in the sealing film or vacuum bag 4 on an inner surface 16 thereof. After completing a lay-up of the bagging assembly 1, an amount of water is then sprayed over the outer surface 15 of the sealing film or vacuum bag 4. If a colour change is brought out on the tape joint 5 extending inwards into the space enclosed by the bag, i.e. the sealing tape 5 occurs in a new colour, then the bagging there is not sufficiently sealed and must be repaired. It is also possible to use such moisture indicators as localised patches inside the sealing film/vacuum bag 4. The patches may, for example, be configured with adhesive on a backside and a protective film on a front side. After attachment of the patches via the adhesive backside, the protective film could then be removed, the bagging completed, and the test performed as mentioned above. An advantage of the system and method of this second embodiment is that no additional equipment, such as IR camera or microphone is necessary. The leakage is visible with the naked eye via a simple visual inspection.

In a third embodiment, the system and method of the present invention uses two films or membranes inside the sealing film or vacuum bag 4. A first of the films or membranes comprises a compound or material that becomes transparent in contact with water or other liquid (i.e. wet T-Shirt effect) and the second is a compound or material that is water-repellent and has a totally different colour than the first, e.g. a blue separating foil. After completing the bagging assembly 1, the liquid (i.e. water) is applied over the outer surface 15 of the sealing film/vacuum bag 4 and in case of a leakage the first material, e.g. peel ply 11 or release ply 13, becomes transparent and, due to the different colour of the second film, this area can be easily visual identified. A main advantage of this variant is that it may help make qualified standard materials for vacuum bagging available. It will be noted that in this embodiment, a greater amount of wetting liquid (water) may be necessary for the desired effect.

In a fourth embodiment, the tape member 5 which forms a seal around the periphery on the inner side of the sealing film or vacuum bag 4 incorporates a compound which reacts in contact with water and changes colour, as with the second embodiment, e.g. a chemical or humidity indicator such as $CuSO_4$ or $CoCl_2$ combined with silica gel. Because the main source of leaks in practice is to be found in the peripheral tape joint 5 around the inner edge of the sealing film or vacuum bag 4, providing a tape member 5 with the properties of a material according to the present invention is therefore very practical.

Figure 2:
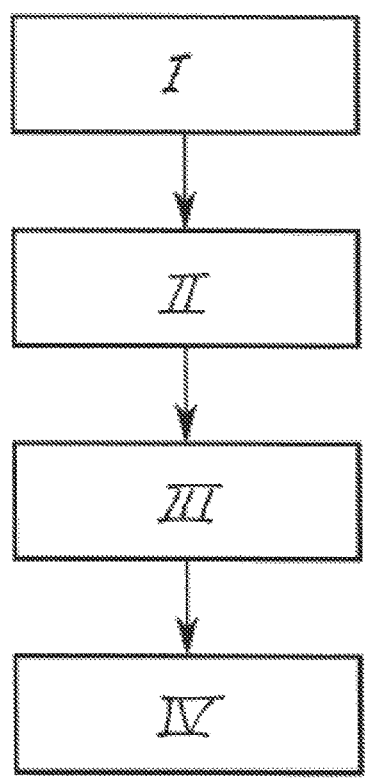
FIG. 2 is a flow diagram which schematically represents a method of leak detection according to an embodiment of the invention.

With reference now to FIG. 2 of the drawings, a method of leak detection during vacuum bagging according to the present invention is illustrated schematically, with the numbered boxes I to IV of the diagram representing steps of the method. The first box I represents the step of arranging a component 3 in a vacuum bagging assembly 1 for impregnation with a polymer or resin, in particular for forming a fibre-reinforced plastic component 3. The second box II represents the step of arranging a material according to the invention—e.g. provided as the sealing film or vacuum bag 4, as the sealing tape 5, and/or as the breather material 8—around or over the component 3 in the vacuum bagging assembly 1 such that the moisture-sensitive compound is on an inner side of the sealing film or vacuum bag 4 of the vacuum bagging assembly 1. The third box III represents the step of applying a vacuum to the vacuum bagging assembly 1 to evacuate a space containing the component 3 and sealed by the sealing film or vacuum bag 4, and the fourth box IV represents the step of wetting an outer surface 15 of the sealing film/vacuum bag 4 and inspecting the wetted sealing film/vacuum bag 4 for visually detecting a possible leak in the vacuum seal by means of a physical and/or chemical change in the compound caused by exposure to moisture.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A vacuum bagging sheet material configured for vacuum bagging a fiber-reinforced plastic component, wherein the sheet material is configured to form a cover layer which entirely covers the component during vacuum bagging, wherein the sheet material comprises a compound sensitive to moisture, such that an exposure of the compound to one of moisture and wetting causes at least one of physical and chemical change in the compound including any one or more of translucence change, opacity change, fluorescence change and temperature change, said change in the compound is either visually detectable in the sheet material in the visible light spectrum to an operator's naked eye or in an electro-magnetic radiation (EMR) spectrum other than the visible light spectrum via at least one of a camera and an optical sensor device, wherein the compound sensitive to moisture is provided throughout the sheet material or over a surface of the sheet material, and wherein the sheet material comprises a breather material for covering the component as an intermediate layer between the component and one of a sealing film and vacuum bag in a vacuum bagging assembly.

2. The sheet material according to claim 1, wherein the sheet material comprises one of a sealing film and a vacuum bag for a vacuum bagging assembly, and wherein the moisture-sensitive compound is provided on an inner side of the sheet material configured to face the component.

3. The sheet material according to claim 2, wherein the moisture-sensitive compound is in the form of one of a film layer and a membrane.

4. The sheet material according to claim 1, wherein the compound is provided at a plurality of discrete locations over the surface of the sheet material.

5. The sheet material according to claim 1, wherein the compound comprises any one or more of: a zeolite, $CuSO_4$, and $CoCl_2$.

6. The sheet material according to claim 1, wherein the compound includes a silica gel.

7. A vacuum bagging leak detection system for leak detection during vacuum bagging of a fiber-reinforced plastic component for impregnation with one of a polymer and resin, the leak detection system comprising a vacuum bagging assembly having a sheet material according to claim 1, such that the compound sensitive to one of wetting and moisture is provided one of under and on an inner side of one of a sealing film and vacuum bag of the vacuum bagging assembly.

8. The system according to claim 7, further comprising at least one of a camera and an optical sensor device configured to inspect the one of the sealing film and vacuum bag of the vacuum bagging assembly for detecting the at least one of the physical and chemical change in the compound of the material caused by exposure to moisture.

9. The sheet material according to claim 1, wherein the compound is provided substantially uniformly throughout the sheet material.

* * * * *